Patented Apr. 13, 1937

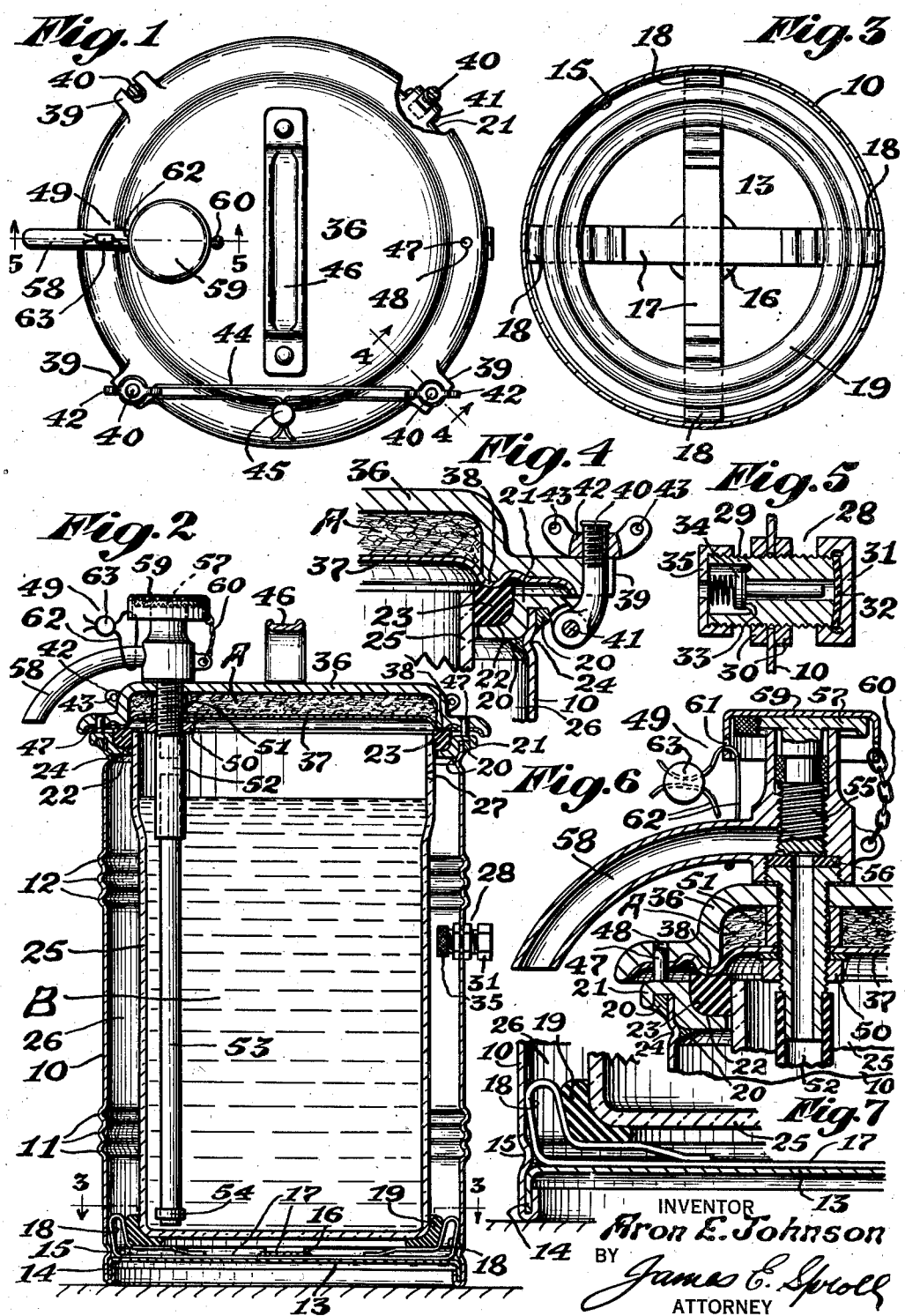

2,076,893

UNITED STATES PATENT OFFICE 2,076,893

BEER DISPENSER

Aron E. Johnson, Seattle, Wash.

Application March 4, 1936, Serial No. 66,992

2 Claims. (Cl. 225—18)

This invention relates to improvements in beer dispensers and aims primarily to provide a beer dispenser especially designed and constructed to avoid the defects previously existent in devices of this type.

The beer dispensers heretofore in use have been defective in that no cushioning means was provided between their outer casings and their fragile beer containers, which in consequence resulted in frequent breakage of the latter. Further, no provision was made heretofore for insulating the covers of such dispensers, hence the contents of the latter became warm and flat in a comparatively short time. Furthermore, no provision was made heretofore for sealing the covers and faucets of these beer dispensers, which fact resulted in the tampering with the contents of the same during the transportation thereof from the producing plants to the consumers.

The present invention, therefore, has for its purpose to obviate the above described defects. This has been primarily attained by providing cushioning means between the lower end of the outer casing and the fragile beer container, thus minimizing breakage of the latter, also by providing the present dispenser with an insulated cover which protects the beer from becoming warm and flat, and also by providing sealing means for the cover and faucet of the instant dispenser which effectively and positively prevents tampering with its contents during transportation, all of which features are to be correlated in the broad aim of enhancing the efficiency of the device for the uses and purposes for which it is primarily designed and intended.

The above, and additional objects which will hereinafter be more specifically treated, are attained by such means as are shown in the accompanying drawing, described in the following specification and then more clearly pointed out in the claims, which are appended hereto, and form a part of this application.

With reference to the drawing in which there is illustrated one embodiment of the invention, and throughout the several views of which like characters of reference designate similar parts:

Fig. 1 is a top plan view of a beer dispenser comprehended by the present invention, certain parts being omitted and certain other parts being broken away for clarity of illustration.

Fig. 2 is a medial vertical section of the same.

Fig. 3 is a horizontal section taken through line 3—3 of Fig. 2.

Fig. 4 is an enlarged fragmentary vertical section taken through line 4—4 of Fig. 1.

Fig. 5 is an enlarged vertical central section of the gas charging valve of the dispenser.

Fig. 6 is a similar section of the beer faucet of the dispenser taken through line 5—5 of Fig. 1, and Fig. 7 is an enlarged fragmentary vertical section of the lower portion of the beer dispenser, illustrating more clearly the cushioning means therein for the fragile beer container.

Beginning now the more detailed description of the invention by reference to the accompanying drawing, the numeral 10 designates a cylindrical outer casing, preferably fabricated from sheet metal, having a series of annular reinforcing ribs 11 formed in spaced parallel relation in the lower portion thereof and a second series of similar ribs 12 formed in similar relation in the upper portion thereof. The casing 10 at its lower end is provided with a bottom wall 13 having an annular depending flange 14 upon its perimeter, which bottom wall is fixedly secured to said casing by return bending or crimping the material of the lower end of the casing upon said annular depending flange 14, substantially in the manner illustrated in Figs. 2 and 7. To further secure the bottom wall 13 to the casing 10 and also to provide a tighter joint therebetween, an annular rib 15 is formed upon the cylindrical casing 10 by flexing the material of the latter inwardly upon the bottom wall 13 at the juncture of the latter with its annular depending flange 14, see Figs. 2 and 7.

Diametrically disposed in crossed or perpendicular relation to each other within the lower end of the casing 10 and fixedly secured to the bottom wall 13 thereof, by soldering or brazing the same thereto, as at 16, are strips 17 of resilient material, such as spring steel or the like, which strips at their free terminals are return-bent upon themselves to form spring loops 18, upon which latter normally rests or seats an annular cushion 19 of resilient or elastic material, such as rubber, or the like, which annular cushion is substantially L-shaped in cross-section for a purpose which will hereinafter be made more apparent.

Fixedly secured to the upper open end of the casing 10, by soldering or brazing the same thereto, as at 20, is an annular rim or flange 21 provided upon its inner and upper portion with a seat 22 for the reception of an annular gasket, 23, preferably fabricated from elastic material, such as rubber and is preferably square in cross-section, as shown more clearly in Figs. 4 and 6. To insure of a better soldered or brazed joint being obtained between the upper end of the casing 10 and the annular rim or flange 21, I form an annular rib 24 upon the upper end of said casing by flexing the material of the latter inwardly, so that an annular seat is provided thereat for the lower outer corner of said annular rim 21, see Figs. 4 and 6.

Concentrically disposed within the cylindrical casing 10 and resting or seating at its lower end within the annular rubber cushion 19 is a fragile beer container 25, preferably fabricated from glass, porcelain or the like, the upper open end or rim of which is substantially and normally flush with the upper face of the rubber gasket 23 when the same is properly seated within the casing 10, it being here noted and observed by referring more particularly to Figs. 4 and 6, that the gasket 23 is adapted to tightly engage or hug the upper exterior portion of the container 25 and thereby positively prevent lateral movements of the upper end of said container, as well as provide an effective and positive seal for an annular gas storage chamber 26 jointly formed by the casing 10 and the fragile container 25. To establish communication between the gas storage chamber 26 and the upper interior portion of the fragile container 25, I provide the walls of said upper portion with one or more gas inlet apertures 27, see Fig. 2.

Mounted within and extending through the walls of the casing 10, at a point thereon substantially midway the height thereof, is a gas charging valve 28 comprising an exteriorly threaded tubular body 29 adapted to be fixedly secured to the walls of said casing 10, as by nuts 30, said body at its outer end having a closure cap 31 threadedly secured thereon provided with a washer 32 to effectually seal said outer end when the cap 31 is attached thereto. The inner end of the tubular body 29 is interiorly enlarged and is provided with a valve seat 33 upon which normally seats an inwardly opening spring-pressed valve 34. Threadedly secured to the inner terminal portion of the tubular body 29 is a centrally apertured cap 35, wherethrough the gas passes to the chamber 26 during gas charging operations, as will be manifest and apparent by referring to Fig. 5. In the present instance carbonic acid gas is employed in the dispenser, but, it is of course to be understood that any other suitable gas may be used.

The numeral 36 designates an insulated cover for the beer dispenser having an inner liner 37 adapted to be fixedly secured thereto, as by welding, brazing or soldering, and interposed between said cover and liner is a layer A of heat insulating material, such as asbestos, or the like. Provided upon the inner liner 37, in the circumferential plane of the gasket 23, is an annular rib 38 formed by flexing the material of said liner downwardly as shown more clearly in Figs. 4 and 6, which rib is adapted to normally abut and seat upon said gasket 23, when the cover 36 is operatively positioned upon the casing 10, to thereby tightly seal the latter. The cover 36 upon its perimeter is provided with a series of circumferentially spaced notched lugs 39 adapted to be engaged by clamping bolts 40 pivotally mounted, as at 41, in circumferentially spaced relation for vertical swinging movement, upon the perimeter of the annular rim or flange 21 of the casing 10, as shown more clearly in Fig. 4, said clamping bolts having wing nuts 42, the wings of which are provided with apertures 43, wherethrough a sealing wire, as 44, is adapted to pass, and tie or secure an opposing pair of such wing nuts together, the terminals of which wire are secured by a seal 45, see Fig. 1, this in order to prevent the loosening of said nuts and the tampering with the contents B of the fragile container 25 during transportation of the beer dispenser from the producing plant to the consumer. To facilitate handling of the beer dispenser a handle 46 is provided therefor, as shown in Figs. 1 and 2. To expedite placement or positioning of the cover 36 upon the dispenser and to prevent lateral movements of the same thereon, while said cover is being secured thereto by the clamping bolts 40, I provide the annular rim 21 of the casing 10 with a series of vertically disposed dowel pins 47 adapted to extend through suitable apertures 48 formed within the cover 36 adjacent the periphery thereof, all as more clearly illustrated in Fig. 6.

Mounted upon and extending downwardly through the cover 36 adjacent the edge thereof is a faucet or tap 49 adapted to be fixedly secured thereto adjacent its inner end, as by a nut 50. Interposed between the cover 36 and its inner liner 37 in concentric relation to that portion of the faucet 49 extending therethrough is a spacer or sleeve 51 to prevent buckling or warping of the said inner liner 37 when the nut 50 is tightened. Detachably secured, as by a flexible rubber sleeve 52, to the inner end of the faucet 49, to depend therefrom in axial prolongation thereto, is a tube 53, preferably of glass, through which the beer or other potable liquid is adapted to rise, which tube in the present instance extends substantially to the bottom of the fragile container 25, see Fig. 1, and adjacent its lower terminal is provided exteriorly with a protective collar 54, of rubber or the like, for the purpose of preventing breakage or fracture of the lower end of the tube 53 during transportation or handling of the beer dispenser when empty, as will be obvious and manifest. The faucet or tap 49 is provided with the usual threaded spindle 55 seating at its inner end upon a seat 56 and at its outer end has a fixed or integral handwheel 57 for effecting opening and closing movements of the same. The faucet or tap 49 is also provided with an elongated discharge spout 58, the outlet end of which extends from the periphery of the cover 36 a sufficient distance to permit a glass or mug being positioned thereunder. To prevent tampering with the faucet or tap 49, during transportation of the beer dispenser between the producing or filling plant and the consumer, a cap 59 is provided to enclose the handwheel 57, which cap is attached to the body of the faucet 49 by a chain 60 and at a substantially diametrically opposite point is provided with an aperture 61 wherethrough a sealing wire 62 is adapted to pass downwardly around the spout 58 and thence upwardly whereby its terminals are secured together by a seal 63, see Figs. 1, 2 and 6.

In the operation of the instant beer dispenser, assuming the cover 36 has been removed or detached, the fragile container 25 is filled with beer substantially to the level indicated in Fig. 2, whereupon the cover 36 is clamped in position thereon in an obvious manner, following which the sealing wires 44 are applied to the wing nuts 42 and the sealing wire 62 is applied to the cap 59 and spout 58, the closure 31 and washer 32 of the gas charging valve 28 are then removed and a gas charging hose not shown is attached to the tubular body 29, whereby carbonic acid gas is introduced into the gas storage chamber 26 until a gas pressure of approximately twenty-five pounds is attained, following which the closure 31 and washer 32 are replaced. As the gas pressure in the chamber 26 increases the gas passes therefrom through the aperture or apertures 27 to the interior upper portion of the fragile beer container 25 wherein it imposes a pressure upon the beer as will be obvious and apparent. The filled and charged beer dispenser is now in readiness for delivery to the consumer, and upon delivery the consumer breaks the seal 63 of the cap 59 and removes the latter from the faucet 49 whereupon beer may be dispensed in an obvious and well known manner.

In the present disclosure I have shown and described the present device as a beer dispenser, but I desire to have it understood that the same may be used for dispensing any other aerated potable liquids, the present showing and description being merely by way of illustration.

Manifestly, therefore, the beer dispenser of the present invention is extremely simple, compact, durable and economical in construction, is efficient and reliable in use, will not readily get out of order, is effectively cushioned against breakage of its fragile liquid container, is also effectively insulated against its contents becoming flat, and is also effectively sealed against tampering during transportation.

While I have herein shown and described the invention with sufficient detail to enable those skilled in the art to which it pertains to understand the mode of construction and the principles involved, it is to be understood that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with other combinations than that shown and described.

Having thus fully described my invention, what I claim as new and desire to secure by Letters Patent is:—

1. An aerated liquid dispenser comprising a fragile liquid container open at the top at full width and having an opening in the walls thereof, an annular pressure medium protective casing surrounding said container and communicating with the interior of the latter through said opening, cushioning means interposed between the lower ends of said container and casing, an annular rim mounted upon the upper end of said casing having an annular seat formed therein, a sealing ring of resilient material mounted within said seat adapted to surround and tightly engage the upper end of said fragile liquid container, an insulated cover for said container and casing adapted to co-act with said sealing ring for positively sealing said container and casing, and a faucet mounted upon said cover having a tube flexibly connected thereto and depending therefrom within the fragile liquid container.

2. An aerated liquid dispenser comprising a cylindrical fragile liquid container open at the top at full width and having an opening in its walls adjacent its upper end, an annular pressure medium and protective casing surrounding said container and communicating with the interior of the latter through said opening, said casing having a series of annular reinforcing ribs formed in the side walls thereof, a pressure medium charging valve mounted in the side walls of said casing, cushioning means interposed between the lower ends of said container and casing, an annular rim rigidly secured to the upper end of said casing having an annular seat formed within the inner walls thereof, an annular gasket of resilient material seating within said seat adapted to surround and tightly engage the upper end of said fragile liquid container, an insulated cover for said container and casing adapted to co-act with said gasket for positively sealing said container and casing, clamping means for said cover, means for sealing said clamping means against tampering, and a faucet sealable against tampering mounted within said cover having a frangible tube flexibly connected thereto and depending therefrom within the fragile liquid container.

ARON E. JOHNSON.